3,326,899
PROCESS FOR PREPARING CAPROLACTAM
Frederick Keith Duxbury and David Harold Johnson, Manchester, England, assignors to Imperial Chemical Industries Limited, London, England, a corporation of Great Britain
No Drawing. Filed Dec. 31, 1962, Ser. No. 248,276
Claims priority, application Great Britain, June 27, 1960, 22,402/60
12 Claims. (Cl. 260—239.3)

This invention relates to a process for the production of caprolactam, and the present application is a continuation-in-part of Ser. No. 119,278, filed June 26, 1961, now abandoned.

According to the present invention we provide a process for the manufacture of caprolactam which comprises treating a mono substituted cyclohexane in which the substituent is a monovalent organic radical in presence of chlorosulphonic acid with a nitrosating agent.

The substituted cyclohexane we prefer to use is hexahydrobenzoic acid or a substituted cyclohexane bearing a pendant radical such as an aliphatic radical optionally substituted

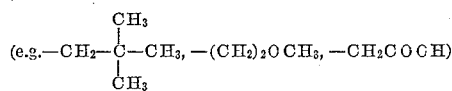

an aromatic aliphatic radically optionally substituted (e.g.
—$CH_2$—$C_6H_5$, $CH_2$—$C_6H_4$—$CH_3$
  —$CH_2$—$C_6H_5$, $CH_2$—$C_6H_4$—$CH_3$
—$CH_2$—$C_6H_4$—COOH), an alicyclic radical optionally substituted (e.g., $C_6H_{11}$—, $C_6H_{10}(CH_3)$—), an aliphatic alicyclic radical optionally substituted

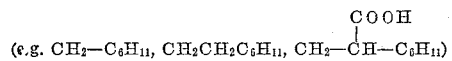

a radical of a ketonic acid (e.g., —CO·$CH_2$·CO·COOH, —CO·CO·$C_6H_5$ —CO—CO—$C_6H_{11}$), a carbinol radical (e.g. —CH(OH)—$C_6H_5$, —C(OH)($C_6H_{11})_2$, —CH(OH)$C_6H_{11}$, —CH(OH)$CH_3$), an acyl radical (e.g. —CO·$CH_3$, —CO·C($CH_3)_3$, —CO·$CF_3$), a sulphonic acid radical (e.g. —$SO_3H$, —$SO_3$—$C_2H_5$) a sulphinic acid radical (e.g. —$SO_2H$, —$SO_2$·$CH_3$), a sulphone radical (e.g. —$SO_2$—$C_6H_{11}$, —$SO_2$—$C_6H_5$, —$SO_2$—$CH_3$) an aroyl radical (e.g. —CO·$C_6H_5$), and an aryl radical (e.g. $C_6H_5$).

The substituted cyclohexane is contacted with the chlorosulphonic acid and nitrosating agent in any convenient manner, preferably by addition of these reagents to the substituted cyclohexane at ordinary or any suitable temperature as indicated by the vigour of the reaction which follows the addition. Usually temperatures about 25° C. and preferably between 70° C. and 120° C. are employed. A preferred nitrosating agent is nitrosyl sulphuric acid, but other nitrosating agents such as nitrosyl chloride and bromide, nitrosyl sulphuric anhydride, alkyl nitrites of general formula R.O.NO (where R is an alkyl radical) such as ethyl, propyl, butyl or amyl nitrite, nitrous anhydride or gases containing nitric oxide and nitrous acid and its salts, may be employed. Usually up to 5 molecular proportions of the nitrosating agent are employed per proportion of substituted cyclohexane.

The molecular proportion of substituted cyclohexane to chlorosulphonic acid preferably lies within the range from 2:1 to 1:2. The molecular proportion of substituted cyclohexane to nitrosating agent preferably lies within the range from 2:1 to 1:1.5.

Caprolactam obtained according to the process of the invention is very suitable for conversion to polyamide fibres. The invention is illustrated but not limited by the following examples in which parts and percentages are by weight—

*Example 1*

A mixture of 30 parts of nitrosylsulphuric acid and 30 parts of chlorosulphonic acid is added over 1.5 hours, with rapid agitation, to 24 parts of hexahydrobenzoic acid which is heated to 90–95° C. The mixture is highly exothermic and when bubbles of carbon dioxide are noted in the reaction mixture, heating of the hexahydrobenzoic acid is immediately discontinued. The rate of addition of the nitrosating mixture is then regulated to hold the reaction temperature between 80° and 90° C. After being stirred for a further 15 minutes at 80° C., the mixture is allowed to cool and poured onto 200 parts of ice. The pH of the resultant mixture is adjusted to 9 by the addition of 0.88 ammonia and the alkaline liquor, so obtained, is extracted three times with chloroform. 100 parts of chloroform are used for each extraction. The combined chloroform extracts are dried over anhydrous magnesium sulphate and the solvent distilled. Fractional distillation of the residue yields 14.9 parts of caprolactam, B.P. 80–85° C./0.5 mm. M.P. 65–66° C. The yield of caprolactam is 70% of theory.

*Example 2*

A mixture of 28 parts of nitrosyl sulphuric acid and 10 parts of chlorosulphonic acid is added over 1.5 hours with efficient agitation to a solution of 28.4 parts of methyl hexahydrobenzoate dissolved in 11 parts of chlorosulphonic acid which is heated to 85–90° C. The reaction is highly exothermic and when bubbles of carbon dioxide are noted in the reaction mixture, heating of the solution which contains the methyl hexahydrobenzoate is immediately discontinued. The rate of addition of the nitrosating mixture is then regulated to hold the reaction temperature between 80–90° C. After being stirred for a further hour at 90° C. the resulting mixture is cooled, poured onto 200 parts of ice and extracted three times, each time with 100 parts of ether. The pH of the acid liquor obtained from the ether extraction is then adjusted to 9 and the alkaline liquor, so obtained, is extracted three times with chloroform. 100 parts of chloroform are used for each extraction. The combined ether extracts are dried over anhydrous $MgSO_4$ and the ether distilled. 2.5 parts of crude methyl hexahydrobenzoate are obtained, B.P. 75–100° C./20 mm. The combined chloroform extracts are dried over anhydrous $MgSO_4$ and the chloroform distilled. Fractional distillation of the residue yields 13.5 parts of caprolactam, B.P. 150°C./20 mm. M.P. 64–66° C. The yield of caprolactam is 60% of theory. No allowance has been made for the recovery methyl hexahydrobenzoate.

*Example 3*

A mixture of 28 parts of nitrosyl sulphuric acid and 12 parts of chlorosulphonic acid is added over 1.5 hours with rapid agitation to a solution of 25.6 parts of hexahydrobenzoic acid dissolved in 12 parts of chlorosulphonic acid which is heated to 90–95° C. The reaction is highly exothermic and when bubbles of carbon dioxide are noted in the reaction mixture, heating of the latter is immediately discontinued. The rate of addition of the nitrosating mixture is then regulated to hold the reaction temperature between 80–90° C. After being heated for a further hour at 95° C. and 2 mm. pressure, the reaction mixture is allowed to cool and poured onto 200 parts of ice. The pH of the resulting solution is adjusted to 9 by the addition of 0.88 ammonia and the alkaline liquor, so obtained, is extracted three times with chloroform. 100 parts of chloroform are used for each extraction. The combined chloroform extracts are dried over anhydrous MgSO₄ and the chloroform distilled. Fractional distillation of the residue yields 15.8 parts of caprolactam, B.P. 150° C./20 mm., M.P. 68–70° C. The yield of caprolactam is 70% of theory. The ammonium sulphate liquors are substantially free from chloride ions.

*Example 4*

A mixture of 20.2 parts of nitrosyl sulphuric acid and 14 parts of chlorosulphnoic acid is added with rapid agitation over 45 min. to a mixture of 25.6 parts of hexahydrobenzoic acid and 4 parts of powdered glass. The latter mixture is heated to 90–95° C. The reaction is highly exothermic and when bubbles of carbon dioxide are noted in the reaction mixture, heating of the hexahydrobenzoic acid is immediately discontinued. The rate of addition of the nitrosating mixture is then regulated to maintain the reaction temperature at 85–95° C. After being stirred for a further 15 min. at 85° C. the mixture is allowed to cool and poured onto 200 parts of ice. The pH of the resulting mixture is adjusted to 9 by the addition of 0.88 ammonia and the alkaline liquor, so obtained, is extracted three times with chloroform. 100 parts of chloroform are used for each extraction. The combined chloroform extracts are dried over anhydrous MgSO₄ and the chloroform distilled. Fractional distillation of the residue yields 10 parts of caprolactam, B.P. 150° C./20 mm., M.P. 64–65° C. The pH of the alkaline liquor obtained from the chloroform extraction is adjusted to 1 by the addition of sulphuric acid, and the acid liquor, so obtained is extracted three times with ether. 100 parts of ether are used for each extraction. The combined ether extracts are dried over hydrous MgSO₄ and the ether distilled. Fractional distillation of the residual liquor yields 12 parts of hexahydrobenzoic acid, B.P. 135–138° C./20 mm. The yield of caprolactam is 83% at a 44% conversion.

*Example 5*

A mixture of 28 parts of nitrosyl sulphuric acid, 9 parts of chlorosulphonic acid and 4 parts of liquid sulphur trioxide is added over 1.2 hours with rapid agitation to a mixture of 25.6 parts of hexahydrobenzoic acid and 9 parts of chlorosulphonic acid which is heated to 80° C. The reaction is highly exotheric and when bubbles of carbon dioxide are noted in the reaction mixture, heating of the latter is immediately discontinued. The rate of addition of the nitrosating mixture is then regulated to hold the reaction temperature between 80–85° C. After being stirred for a further hour at 95° C. and 2 mm. pressure, the mixture is allowed to cool and poured onto 200 parts of ice. The pH of the resulting mixture is adjusted to 9 by the addition of 0.88 ammonia and the alkaline liquor, so obtained, is extracted three times with chloroform. 100 parts of chloroform are used for each extraction. The combined chloroform extracts are dried over anhydrous MgSO₄ and the chloroform distilled. Fractional distillation of the residue yields 14 parts of caprolactam, B.P. 150° C./20 mm., M.P. 65–66° C. The pH of the alkaline liquor obtained from the chloroform extraction is adjusted to 1 by the addition of sulphuric acid and the resulting acid liquor is extracted three times with ether. 100 parts of ether are used for each extraction. The combined ether extracts are dried over anhydrous MgSO₄ and the ether distilled. Fractional distillation of the residue yields 3 parts of hexahydrobenzoic, B.P. 130–135° C./20 mm. The yield of caprolactam is 70% at a conversion of 62%.

*Example 6*

A mixture of 30 parts of nitrosyl sulphuric acid and 30 parts of chlorosulphonic acid is reacted with 24 parts of hexahydrobenzoic acid as described in Example 1. 20 parts of the resulting mixture is charged into a continuous reactor and heated to 90° C. The continuous reactor is equipped with agitator and water jacket and has a hold-up volume of approximately 25 ml. Solutions of 126 parts of hexahydrobenzoic acid dissolved in 57 parts of chlorosulphonic acid and 135 parts of nitrosyl sulphuric acid dissolved in 61 parts of chlorosulphonic acid respectively, are then simultaneously added over 45 min. to the reactor. When the temperature of the reaction mixture attains 100° C. heating of the reactor is immediately discontinued and the reaction mixture is maintained at 105–110° C. by the occasional application of cold water to the jacket of the continuous reactor. The acid liquor obtained from the reactor is cooled and added over 45 minutes together with ammonia gas to 750 parts of water which is maintained at 20–25° C. by means of an internal cooling coil through which is passed brine solution at −5° C. The ammonia gas is added at a rate sufficient to maintain the neutralized mixture at pH 9. The alkaline liquor, so obtained, is extracted six times with chloroform. 150 parts of chloroform are used for each extration. The combined chloroform extracts are dried over anhydrous MgSO₄ and the chloroform distilled. Fractional distillation of the residue yields 75 parts of caprolactam, B.P. 150–152 °C./20 mm., M.P. 64–65° C. The pH of the alkaline liquor obtained from the chloform extraction is adjusted to 1 by the addition of sulphuric acid and the resulting acid liquor is extracted six times with ether. 150 parts of ether are used for each extraction. The combined ether extracts are dried over anhydrous MgSO₄ and the ether distilled. Fractional distillation of the residue yields 17 parts of hexahydrobenzoic acid, B.P. 123–126° C./15 mm. The yield of caprolactam is 78% at 67% conversion.

*Example 7*

A mixture of 3.4 parts of nitrosyl sulphuric acid and 3 parts of chlorosulphonic acid is added over 25 minutes with rapid agitation, to a mixture of 4.8 parts of cyclohexylphenylketone and 3 parts of chlorosulphonic acid maintained at 5–10° C. by ice cooling. After being stirred for 20 hours at 35° C. the mixture is poured onto 30 parts of ice and the resultant solution extracted three times with ether. The aqueous acid solution is then adjusted to pH 8 with 0.88 ammonia and the alkaline liquor, so obtained, is extracted three times with chloroform. The combined chloroform extracts are dried over anhydrous magnesium sulphate and the solvent distilled. Recrystallisation of the residue from cyclohexane yields 0.5 g. caprolactam M.P. 68° C. 0.75 g. of benzoic acid is isolated from the combined ether extracts by distillation of of the solvent and recrystallisation of the residue from water.

*Example 8*

A mixture of 12 parts of nitrosyl chloride and 28 parts of chlorosulphonic acid is added over 45 minutes with rapid agitation, to 25.6 parts of hexahydrobenzoic acid which is heated to 90–95° C. When bubbles of carbon dioxide are noted in the reaction mixture, heating of the hexahydrobenzoic acid is immediately discontinued. The rate of addition of the nitrosating mixture is then regulated to hold the reaction temperature between 80° and 90° C. After being stirred for a further 15 minutes at 80° C. the mixture is allowed to cool and poured onto 200 parts of ice. The pH of the resultant mixture is adjusted to 9 by the addition of 0.88 ammonia and the alkaline liquor, so obtained, is extracted three times with chloroform. The pH of the aqueous layer is rest adjusted to 1 by the addition of sulphuric acid and the acid liquor, so obtained, is extracted three times with ether. The combined chloroform extracts are dried over anhydrous magnesium sulphate and the solvent distilled. Fractional distillation of the residue yields 9.5 parts of caprolactam. B.P. 140–145° C./15 mm., M.P. 66–68° C. The combined ether extracts are dried over anhydrous magnesium sulphate and the solvent distilled. Fractional distillation of the residue yields 8.5 parts of cyclohexanecarboxylic acid.

Example 9

A mixture of 27 parts of nitrosyl sulfonic acid and 12 parts of chlorosulphonic acid is added over 45 minutes with rapid agitation, to a mixture of 39.2 parts of dicyclohexylcarbinol and 12 parts of chlorosulphonic acid which is initially heated to 90–95° C. The rate of addition of the nitrosating mixture is then regulated to hold the reaction temperature between 80° and 90° C. After being stirred for a further 15 minutes at 80° C. the mixture is allowed to cool and poured onto 200 parts of ice. The pH of the resultant mixture is adjusted to 9 by the addition of 0.88 amomnia and the alkaline liquor, so obtained, is extracted three times with chloroform. 100 parts of chloroform are used for each extraction. The combined chloroform extracts are dried over anhydrous magnesium sulphate and the solvent distilled. Fractional distillation of the residue yields caprolactam, B.P. 80–85° C./0.5 mm., M.P. 66–68° C.

Example 10

A mixture of 30 parts of nitrosyl sulphuric acid and 30 parts of chlorosulphonic acid is added over 90 minutes with rapid agitation to 19.6 parts of hexahydrotoluene which is heated to 90–95° C. After the addition is completed, the mixture is stirred for a further 15 min. at 80° C. then allowed to cool and poured onto 200 parts of ice. The resultant mixture is extracted three times with ether after which it is adjusted to pH 9 by the addition of 0.88 ammonia and the alkaline liquor, so obtained, extracted three times the chloroform. 100 parts of chloroform are used for each extraction. The combined chloroform extracts are dried over anhydrous magnesium sulphate and the solvent distilled. Recrystallisation of the residue from cyclohexane yields caprolactam M.P. 64–65° C.

What we claim is:

1. A process for the manufacture of caprolactam which comprises treating a mono substituted cyclohexane in which the substituent is selected from the group consisting of a radical having the formula

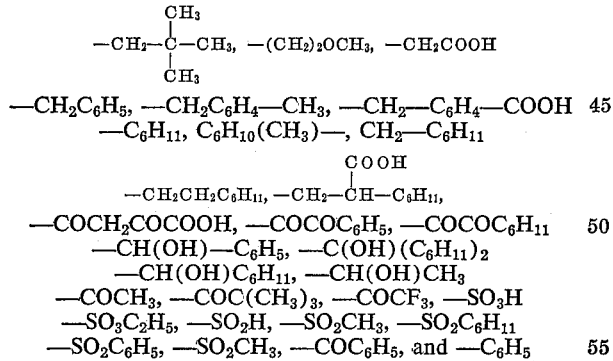

in the presence of chlorosulphonic acid with a nitrosating agent at a temperature between 25° C. and 120° C., the molecular proportion of nitrosating agent to said monosubstituted cyclohexane being up to 5:1 and the molecular proportion of monosubstituted cyclohexane to said cholosulphonic acid being between 2:1 to 1:2.

2. Process according to claim 1 wherein the substituted cyclohexane is hexahydrobenzoic acid.

3. Process according to claim 2 wherein the nitrosating agent is nitrosyl sulphuric acid.

4. Process according to claim 3 wherein the reaction is carried out at from 70° C. to 120° C.

5. Process according to claim 4 wherein the molecular proportion of substituted cyclohexane to chlorosulphonic acid lies within the range from 2:1 to 1:2 and the molecular proportion of substituted cyclohexane to nitrosating agent lies within the range from 2:1 to 1:1.5.

6. The process of claim 1 wherein the nitrosating agent is a nitrosyl halide.

7. The process of claim 6 wherein the nitrosyl halide is nitrosyl chloride.

8. Process for the manufacture of caprolactam which comprises treating hexahydrobenzoic acid in the presence of chlorosulphonic acid with nitrosyl sulphuric acid at a temperature from 70° C. to 120° C. the molecular proportion of hexahydrobenzoic acid to chlorosulphonic acid ranging from 2:1 to 1:2, and the molecular proportion of hexahydrobenzoic acid to nitrosyl sulphuric acid ranging from 2:1 to 1:1.5.

9. The process of claim 1 wherein the substituted cyclohexane is methyl hexahydrobenzoate.

10. The process of claim 1 wherein the substituted cyclohexane is cyclohexylphenylketone.

11. The process of claim 1 wherein the substituted cyclohexane is dicyclohexylcarbinol.

12. The process of claim 1 wherein the substituted cyclohexane is hexahydrotoluene.

References Cited

UNITED STATES PATENTS

| 3,022,291 | 2/1962 | Muench et al. | 260—239.3 |
| 3,114,748 | 12/1963 | Bigot et al. | 260—239.3 |
| 3,119,814 | 1/1964 | Bigot et al. | 260—239.3 |

FOREIGN PATENTS

| 1,238,981 | 7/1960 | France. |

OTHER REFERENCES

Australian Abstract, 52,901/59, Mar. 24, 1960; 260—239.3.

Australian Abstract, 52,908/59, Mar. 24, 1960; 260—239.3.

Australian Abstracts, 58,823/60, Sept. 29, 1960; 260—239.3.

Moeller, "Inorganic Chemistry," pp. 524–5 (Wiley) (1952).

WALTER A. MODANCE, *Primary Examiner.*

D. McCUTCHEN, *Examiner.*

R. T. BOND, *Assistant Examiner.*